Dec. 22, 1942.  L. F. MARSH  2,306,316

DIE STRUCTURE FOR INJECTION MOLDING MACHINES

Filed April 10, 1939

Inventor:
Leon F. Marsh
By Owen W. Kennedy
Attorney

Patented Dec. 22, 1942

2,306,316

UNITED STATES PATENT OFFICE 2,306,316

DIE STRUCTURE FOR INJECTION MOLDING MACHINES

Leon F. Marsh, Hudson, Mass., assignor to Reed-Prentice Corporation, Worcester, Mass., a corporation of Massachusetts Application April 10, 1939, Serial No. 266,928

3 Claims. (Cl. 18—42)

The present invention relates to injection molding machines, particularly those employing material which is first rendered plastic by the application of heat, and is then injected under pressure into cooperating dies, one of which is movable with respect to the other.

The object of the invention is to provide an improved die structure, wherein one die is provided with means for obtaining localized cooling of a portion of plasticized material sufficient to cause its being solid enough to insure complete withdrawal of the molded material from the stationary die, prior to its ejection from the machine. The above and other advantageous features of the invention will hereinafter more fully appear from the following description, considered in connection with the accompanying drawing, in which—

Like reference characters refer to like parts in the different figures.

Figure 1:
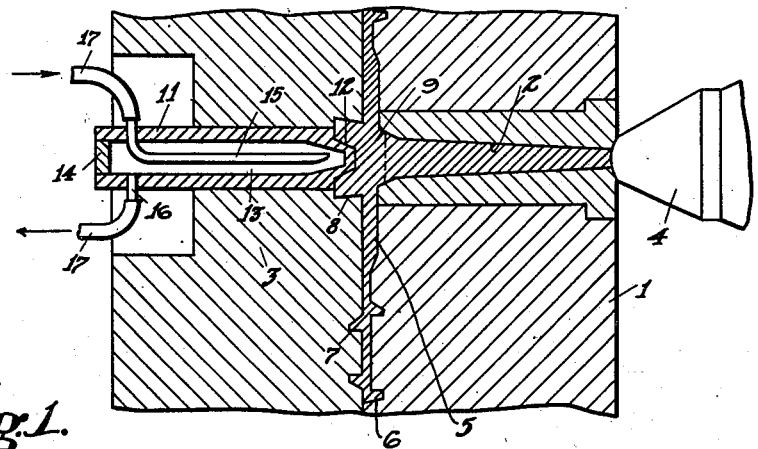
Fig. 1 is a sectional view of a pair of cooperating dies embodying the invention.

Referring to the drawing, a stationary die 1 is shown as providing a sprueway 2 of increasing cross-section, in the direction of a second die 3 that is movable back and forth with respect to the die 1 by any suitable means, not shown. A nozzle 4 is adapted to engage the smaller end of the sprueway 2, and to deliver heated plastic material under pressure from any suitable source, not shown. Runners 5 radiate from the sprueway 2, in communication with molding recesses 6 and 7 provided in the dies 1 and 3, respectively, and the movable die 3 also provides a recess 8 in alinement with the sprueway 2.

When the dies of the character shown are utilized to mold articles from thermoplastic material, difficulties have heretofore arisen from the fact that certain thermoplastic materials exhibit a relatively narrow temperature range in which they have the desired flow characteristics for molding. As a result, material spreading rapidly into the die recesses 6 and 7, tends to cool and solidify more rapidly than the material in the vicinity of the sprueway 2, where it is more concentrated. Consequently, when the die 3 is moved away from the die 1 to withdraw the molded article, the material is liable to break near the base of the sprue 9, as indicated in dotted lines, due to the fact that it is still in a semi-plastic condition at that point, as compared to the molded article 10.

According to the present invention, provision is made for cooling a portion of thermoplastic material disposed within the movable die in the vicinity of the sprue 9, so that the material at that point will have cooled and solidified sufficiently to insure that the sprue 9 will withdraw cleanly with the molded article, and no material will be left to clog the sprueway when the next shot is made.

As an illustrative example of one way of accomplishing such localized cooling, an ejector 11 provides a reduced nose 12 projecting into the recess 8. The nose 12 is so proportioned that it will be surrounded on three sides by molded material within the recess 8, with the end of the nose located near where the sprue 9 is of greatest cross-section. The ejector 11 is hollow, so as to provide a chamber 13 closed at one end by a plug 14, with the other end of the chamber extending inside the nose 12. Suitable means are provided for circulating a cooling medium within the chamber 13, as for example, by means of a nozzle 15 discharging in the direction of the nose 12, with the wall of the chamber providing a discharge opening 16, to carry off the cooling medium. The movable die 3 is partially cut away in the vicinity of the ejector 11, so as to permit the admission and discharge of the cooling medium to and from the chamber 13 through flexible conduits 17, coincidentally with movement of the die 3, and of the ejector 11.

Figure 2:
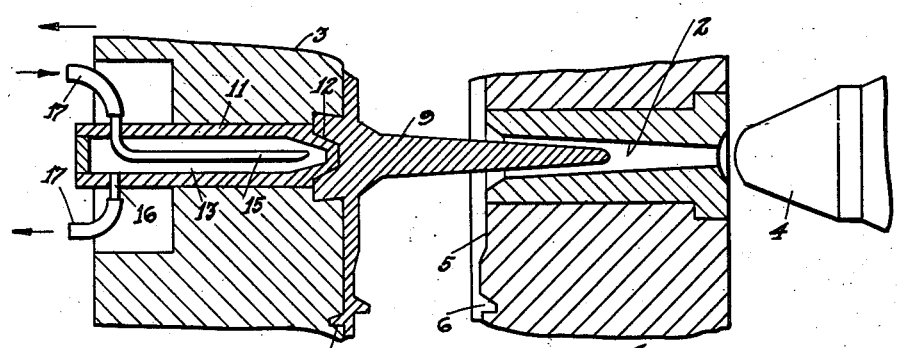
Fig. 2 is a fragmentary sectional view of portions of the dies shown in Fig. 1, illustrating withdrawal of a molded article from the stationary die.
Figure 3:
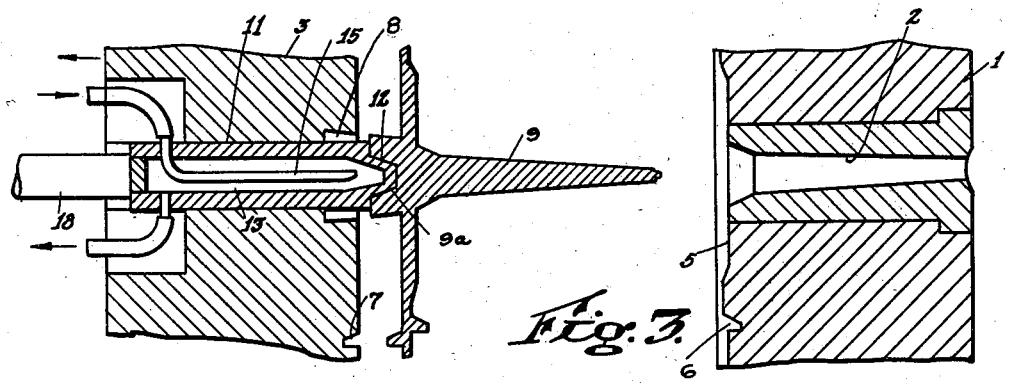
Fig. 3 is a fragmentary view similar to Fig. 2, illustrating ejection of the article from the movable die.
Figure 4:
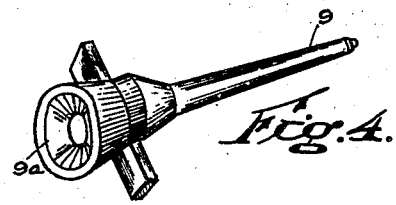
Fig. 4 is a fragmentary view, showing a portion of a molded article in perspective.

When the nozzle 4 delivers a charge of thermoplastic material under pressure, so as to completely fill the molding receses 6 and 7, the runners 5 and the sprueway 2, the material in the recess 8 starts to cool, upon contact with the nose 12, and this cooling effect is rapidly communicated to the base of the sprue 9. As a result of the accelerated cooling at the nose 12, the material within the recess 8 in the movable die 3, solidifies at least as fast as the material in the molding recesses 6 and 7. Consequently, when the die 3 is moved away from the die 2, to withdraw the molded articles, as shown in Fig. 2, the sprue 9 pulls cleanly out of the sprueway 2. As the die 3 reaches the limit of its withdrawing movement, as shown in Fig. 3, the ejector pin 11 strikes a stationary stop 18, thereby clearing the molded article from the die 3, and permitting its discharge from the machine by suitable means, not shown. The central portion of a molded article is shown in perspective in Fig. 4, from which it is evident that the base of the sprue 8 provides a recess 8a, formed by the cooling nose 12.

From the foregoing, it is apparent that by the present invention, there is provided an improved die structure for plastic molding machines, characterized by the provision of means for obtaining localized cooling of a portion of plasticized material disposed within the movable die in the vicinity of the sprue. As a result of such localized cooling, material in the vicinity of the sprue is sufficiently solidified to insure complete withdrawal of all material from the stationary die, with the molded articles. As a direct result of this cooling effect, it is possible to operate the molding machine with the intervals between shots best timed to insure the desired degree of solidity in the molded articles, rather than in the vicinity of the sprue.

I claim:

1. In combination, a stationary die and a movable die defining a molding cavity, a sprueway extending from said cavity through the stationary die, means for delivering heated plastic material to said cavity through said sprueway, an ejection plunger carried by the movable die, with a portion projecting into said cavity in alinement with said sprueway, and means for cooling the projecting portion of said plunger to accelerate the solidifying of material within the cavity surrounding said plunger portion, as well as within the vicinity of said sprueway.

2. In combination, a stationary die and a movable die defining a molding cavity, a sprueway extending from said cavity through the stationary die, means for delivering heated plastic material to said cavity through said sprueway, a plunger carried by the movable die with a reduced nose portion thereof projecting into said die cavity in alignment with said sprueway, so that plastic material delivered through said sprueway will substantially surround said nose within the cavity, and means for cooling the nose portion of said plunger to accelerate the solidifying of plastic material in contact therewith.

3. In combination, a stationary die and a movable die defining a molding cavity, a sprueway extending from said cavity through the stationary die, means for delivering heated plastic material to said cavity through said sprueway, a plunger carried by the movable die with a reduced nose portion thereof projecting into said die cavity in alinement with said sprueway, so that plastic material delivered through said sprueway will substantially surround said nose within the cavity, and means for cooling the nose portion of said plunger to accelerate the solidifying of plastic material in contact therewith, movement of said plunger after the dies have opened serving to cause said plunger to clear the molded article from said dies, by reason of the support of said article on said plunger nose.

LEON F. MARSH.